(12) United States Patent
Kozlowski et al.

(10) Patent No.: US 9,314,755 B2
(45) Date of Patent: Apr. 19, 2016

(54) CUP HOLDING ASSEMBLY FOR A FOOD MIXING MACHINE

(71) Applicant: Vita-Mix Corporation, Cleveland, OH (US)

(72) Inventors: Eugene J. Kozlowski, Medina, OH (US); John K. Barnard, Olmstead Falls, OH (US)

(73) Assignee: Vita-Mix Corporation, Cleveland, OH (US)

(*) Notice: Subject to any disclaimer, the term of this patent is extended or adjusted under 35 U.S.C. 154(b) by 334 days.

(21) Appl. No.: 13/923,801

(22) Filed: Jun. 21, 2013

(65) Prior Publication Data

US 2013/0277921 A1 Oct. 24, 2013

Related U.S. Application Data

(62) Division of application No. 12/661,399, filed on Mar. 16, 2010, now Pat. No. 8,491,179.

(51) Int. Cl.

| | |
|---|---|
| *B01F 15/00* | (2006.01) |
| *A23G 9/12* | (2006.01) |
| *A47J 43/07* | (2006.01) |
| *B01F 7/16* | (2006.01) |
| *B01F 7/00* | (2006.01) |

(52) U.S. Cl.
CPC .............. *B01F 15/0074* (2013.01); *A23G 9/12* (2013.01); *A47J 43/0705* (2013.01); *A47J 43/0727* (2013.01); *B01F 7/00333* (2013.01); *B01F 7/1605* (2013.01); *B01F 7/0025* (2013.01)

(58) Field of Classification Search
CPC ................... A47J 2043/04463; A47J 43/0705; A47J 43/0727; A23G 9/12; B01F 7/00333; B01F 7/1605; B01F 7/0025
USPC .......... 366/204, 212, 279, 285, 286, 343–346
See application file for complete search history.

(56) References Cited

U.S. PATENT DOCUMENTS

| | | | | | |
|---|---|---|---|---|---|
| 2,299,789 | A | * | 10/1942 | Black .................... | C23G 5/04 122/40 |
| 2006/0213922 | A1 | | 9/2006 | Lodter et al. | |

* cited by examiner

*Primary Examiner* — Timothy Cleveland
(74) *Attorney, Agent, or Firm* — Renner, Kenner, Greive, Bobak, Taylor & Weber

(57) ABSTRACT

A food mixing machine (20) has an agitator (25) to mix food in a cup (C). A cup holder (31) is provided with a flexible boot (32) which receives the cup (C). The cup holder (31) is moveable through an opening (90) in the machine (20) and carries a gripping assembly (33) and an actuator assembly (34). The actuator assembly (34) is moveable relative to the gripping assembly (33) and is biased by springs (35) to maintain fingers (56) of the gripping assembly (33) in engagement with the cup (C). When it is desired to release the cup (C), a release assembly (80) overcomes the bias of the springs (35). As the cup holder (31) moves through the opening (90), the area between the cup holder (31) and the opening (90) is sealed by a seal assembly (91) so that food materials cannot go through the opening (90).

4 Claims, 13 Drawing Sheets

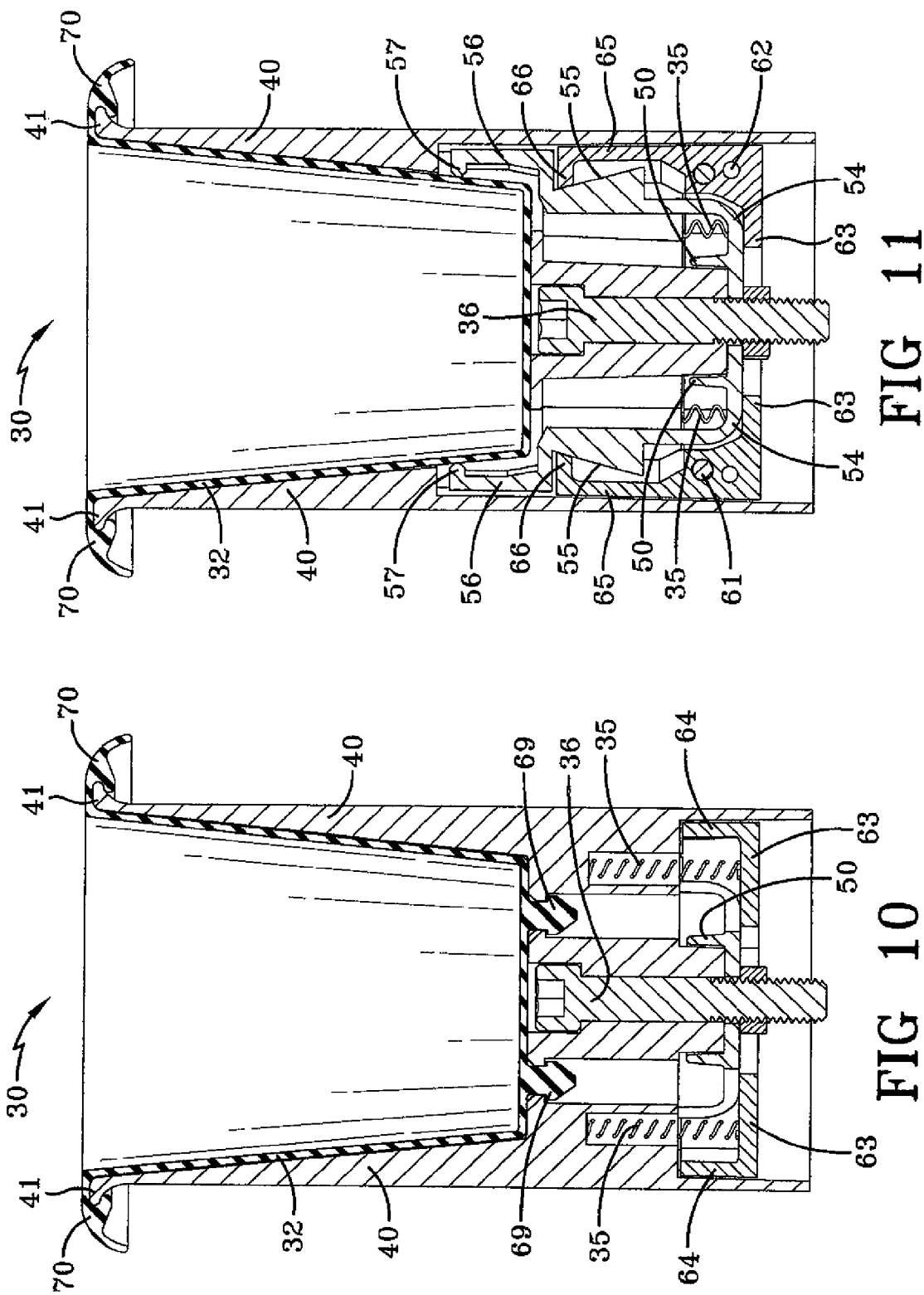

CUP HOLDING ASSEMBLY FOR A FOOD MIXING MACHINE

CROSS-REFERENCE TO RELATED APPLICATION

This application is a division of U.S. patent application Ser. No. 12/661,399 filed Mar. 16, 2010.

TECHNICAL FIELD

This invention relates to a machine which mixes food products in a cup. More particularly, this invention relates to a cup holding assembly for such a machine. More specifically, this invention relates to a cup holding assembly which automatically engages the cup while the food is being mixed therein, and releases the cup when the mixing process is completed.

BACKGROUND ART

Many establishments, such as fast food restaurants or the like, mix food products, such as blending condiments into soft serve ice creams, smoothies or the like, directly in the cup to be used by the customer to consume the product. It is a time saving advantage if such machines are fully automated. In such situations, the cup is filled with the products to be blended and is placed in a cup holder. Upon activation of the machine, the cup holder can rotate and can move upwardly to allow an agitator to be received in the cup and mix the products contained therein. The cup holder then moves downwardly to the home position and the machine is deactivated so that the cup can be removed from the cup holder with the food product therein being mixed and ready for consumption.

A problem with this process is that the cup could, at times, become dislodged from the cup holder. That is, as the cup holder and agitator rotate, the turbulence created in the food product could cause the cup to rotate and/or wobble in the cup holder. Such could not only allow food to spill out of the cup, but also if the turbulence is great enough, the cup itself could come out of the cup holder. Such would particularly be the case if the cup were permitted to wobble so much that it was engaged by the agitator thereby being easily dislodged from the cup holder.

An additional problem with some machines of the prior art is that food product spillage can reside on the outside of the cup holder. Such could occur based on normal spillage of food as it is being mixed, which could readily happen if the cup is overfilled, or it could occur based on the wobbling of the cup previously described. If unabated, such spillage may then run down the sides of the cup holder and into the operating components of the machine causing contamination thereto.

The need exists, therefore, for a system of holding a cup stable in a cup holder and also sealing the outside of the cup holder to prevent contamination in the event of food spillage from the cup.

DISCLOSURE OF THE INVENTION

It is thus an object of one aspect of the present invention to provide a food mixing machine with a cup holding assembly that grips the cup while food is being mixed therein and that releases the cup when the mixing process is completed.

It is an object of another aspect of the present invention to provide a cup holding assembly that it is provided with a seal around the exterior periphery of the cup holder.

These and other objects of the present invention, as well as the advantages thereof over existing prior art forms, which will become apparent from the description to follow, are accomplished by the improvements hereinafter described and claimed.

In general, a food mixing machine mode in accordance with one aspect of the present invention has an agitator to mix food in a cup and includes a cup holder adapted to receive the cup therein. A gripping member is positioned within the cup holder. A gripping actuator is moveable relative to the gripping member so that upon movement of the actuator, the gripping member selectively engages or releases the cup.

In accordance with another aspect of the invention a food mixing machine includes a housing having an opening. A cup holder is adapted to be moved through the opening. A seal assembly is carried by the housing and includes a seal to engage the cup holder as the cup holder moves through the opening.

These aspects combine to provide a food mixing machine having an agitator to mix food in a cup and including a housing having an opening. A cup holder is adapted to receive the cup and move through the opening. A seal assembly is carried by the housing and includes a seal to engage the cup holder as the cup holder moves through the opening. A gripping member is positioned within the cup holder. An actuator is moveable relative to the gripping member so that upon movement of the actuator, the gripping member selectively engages or releases the cup.

The invention also contemplates a method of mixing food in a cup with an agitator which includes the steps of placing the cup in a cup holder, moving the cup toward the agitator while at the same time gripping the cup in the cup holder, using the agitator to mix the food, moving the cup holder away from the agitator, and releasing the cup from the cup holder.

A preferred exemplary cup holder for a food mixing machine according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 10 is a sectional view taken substantially along line 10-10 of FIG. 1.

FIG. 11 is a sectional view taken substantially along line 11-11 of FIG. 1.

PREFERRED EMBODIMENT FOR CARRYING OUT THE INVENTION

Figure 1:
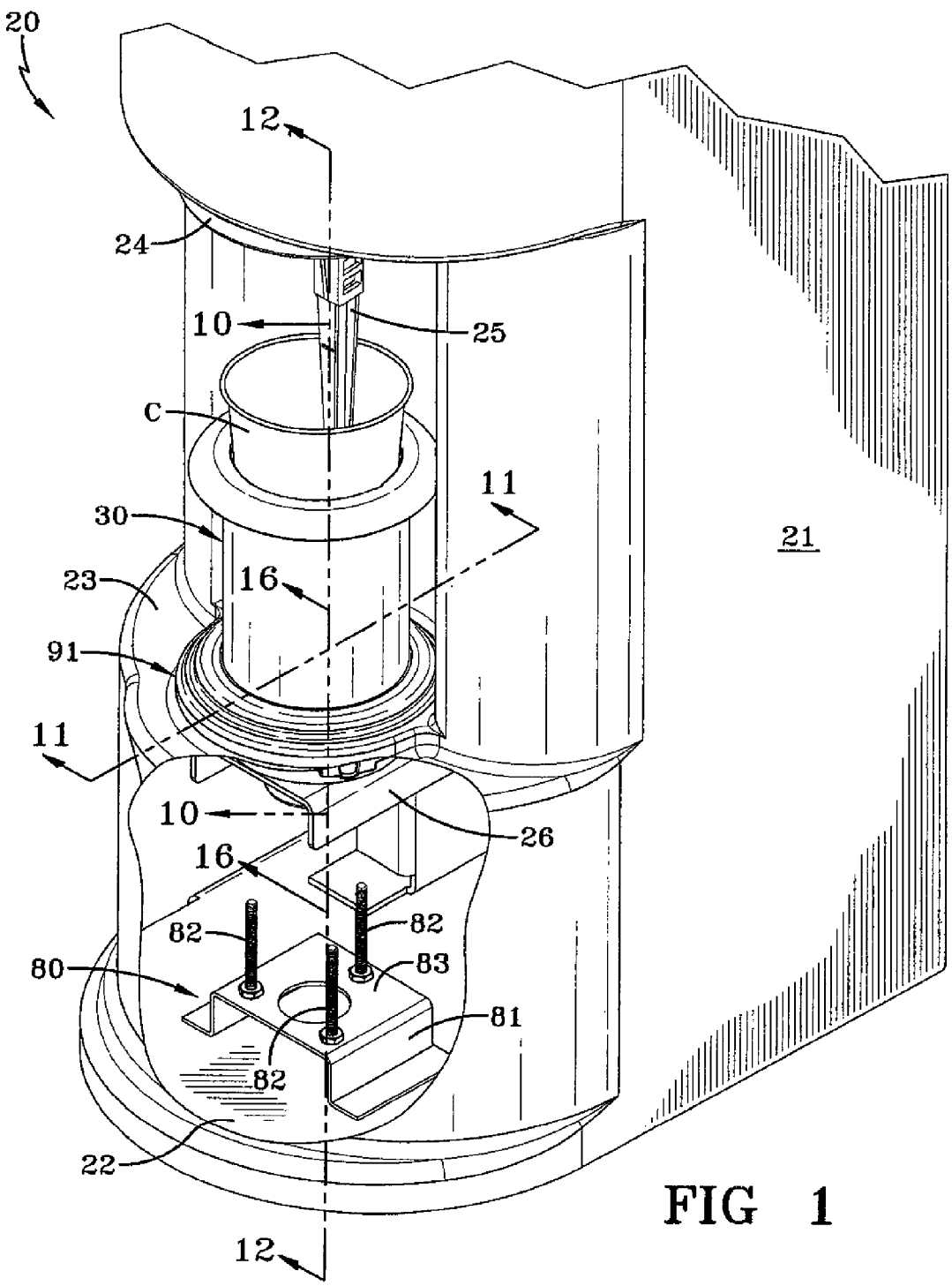
FIG. 1 is a somewhat schematic fragmented representation of a food mixing machine having the cup holding assembly of the present invention.

A food mixing machine is somewhat schematically shown in FIG. 1 and is indicated generally by the numeral 20. Machine 20 includes a housing 21 which covers the components of the machine and which includes a lower platform 22, an intermediate platform 23 and an upper platform 24. An agitator 25, shown to be in the configuration of a spoon, extends downwardly from upper platform 24 and is rotated by a motor (not shown) carried by one of the platforms. Agitator 25 is designed to mix food products in a cup C. A travel plate 26 is moveable upwardly and downwardly by a motor (not shown) carried by one of the platforms. Travel plate 26 also carries a shaft 27, bearings 28 and a pulley 29 which is driven by a motor (not shown) carried by one of the platforms, as will hereinafter be described in more detail. Reference is made to U.S. patent application Ser. No. 12/460,273 filed Jul. 17, 2009 for whatever details are necessary for the complete understanding of a typical machine 20 and its operation.

Figure 2:
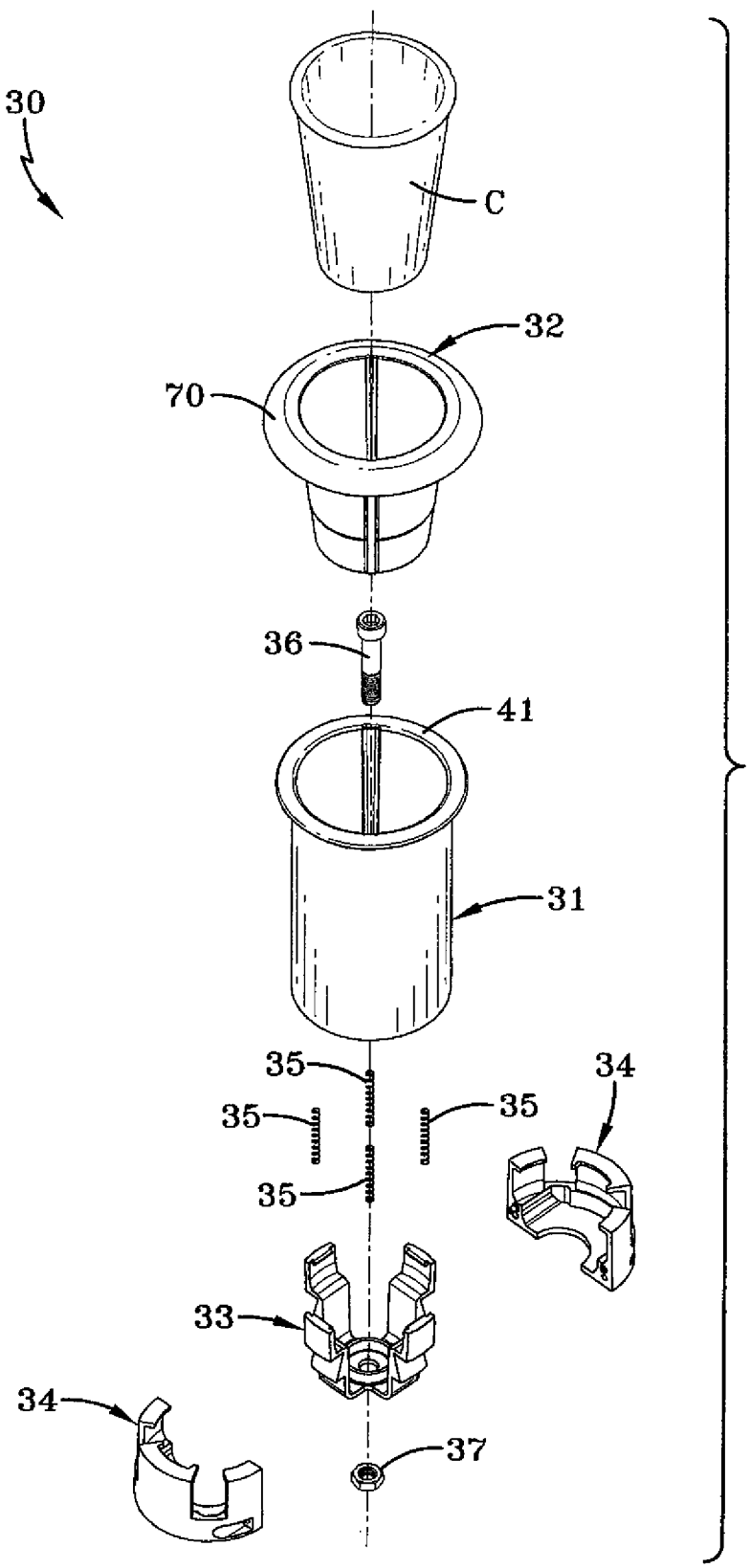
FIG. 2 is a top perspective exploded view of the components of the cup holding assembly.
Figure 3:
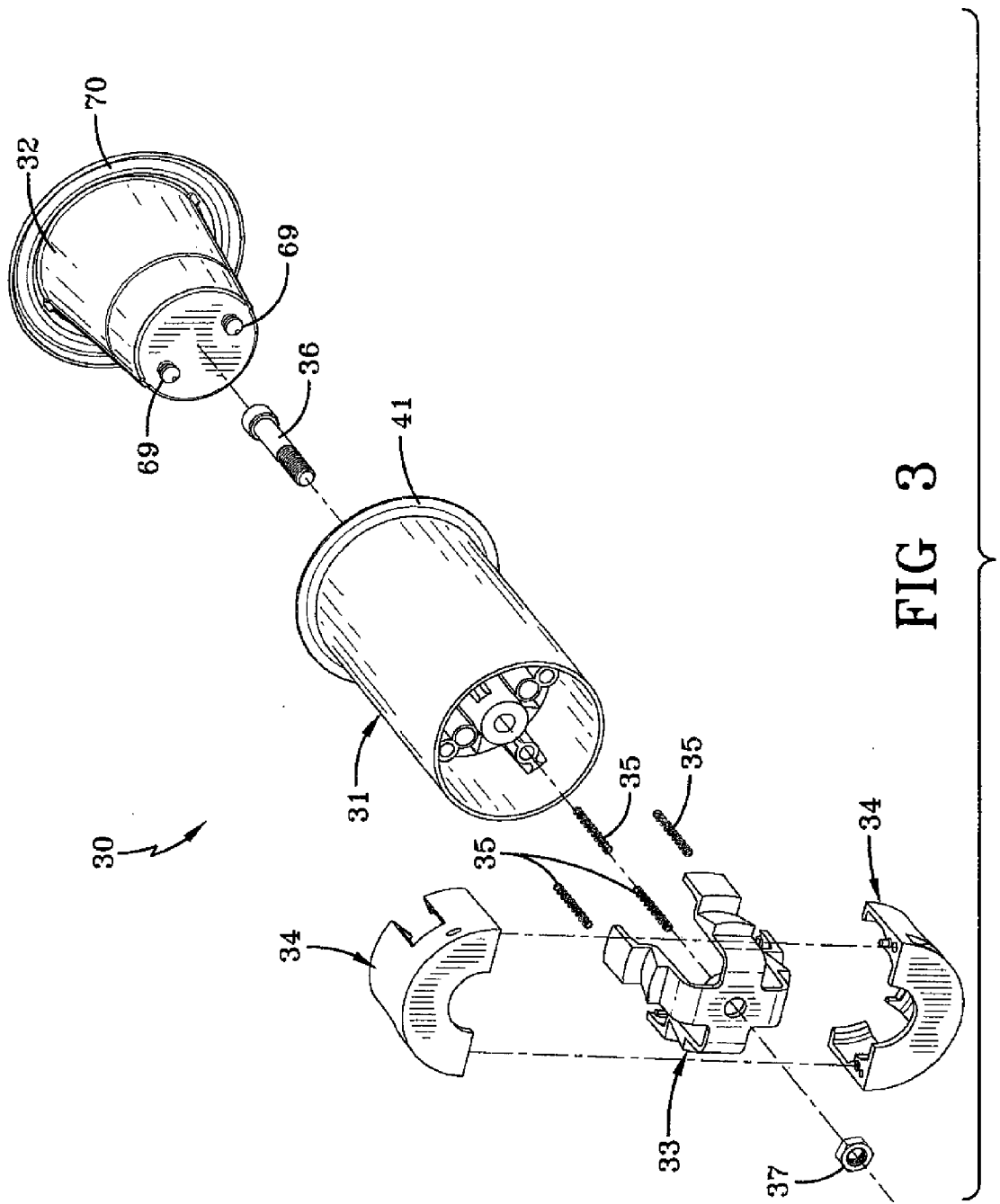
FIG. 3 is a bottom perspective exploded view of the components of the cup holding assembly.

Travel plate 26 carries a cup holding assembly generally indicated by the numeral 30. The basic components of cup holding assembly 30 are shown in FIGS. 2 and 3 and include a cup holder generally indicated by the numeral 31 and made of a rigid plastic material, a flexible boot 32 made of a rubber-like material, a cup gripping assembly generally indicated by the numeral 33, and a gripping actuator assembly generally indicated by the numeral 34 and shown to be in two pieces. As will hereinafter be described in more detail, cup holder assembly also includes a plurality of springs 35 and its components are held together by a bolt 36 which receives a nut 37.

Figure 4:
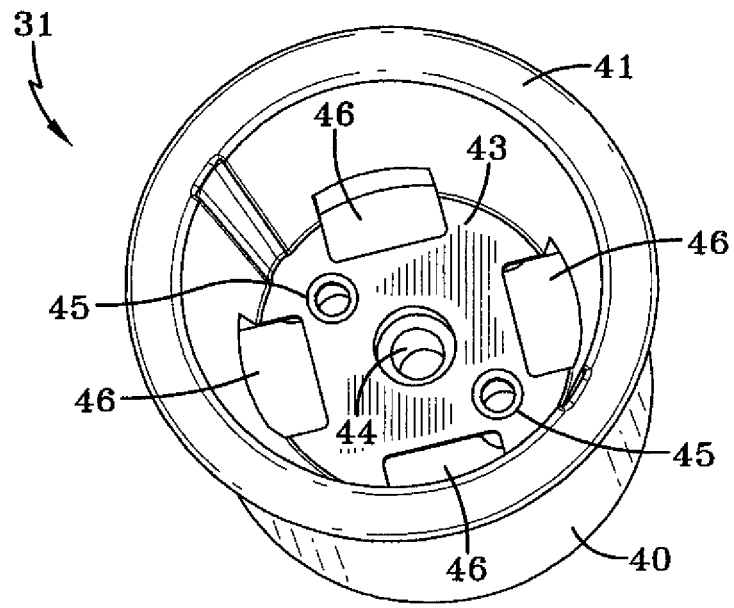
FIG. 4 is a top perspective view of the cup holder component of the cup holding assembly.
Figure 5:
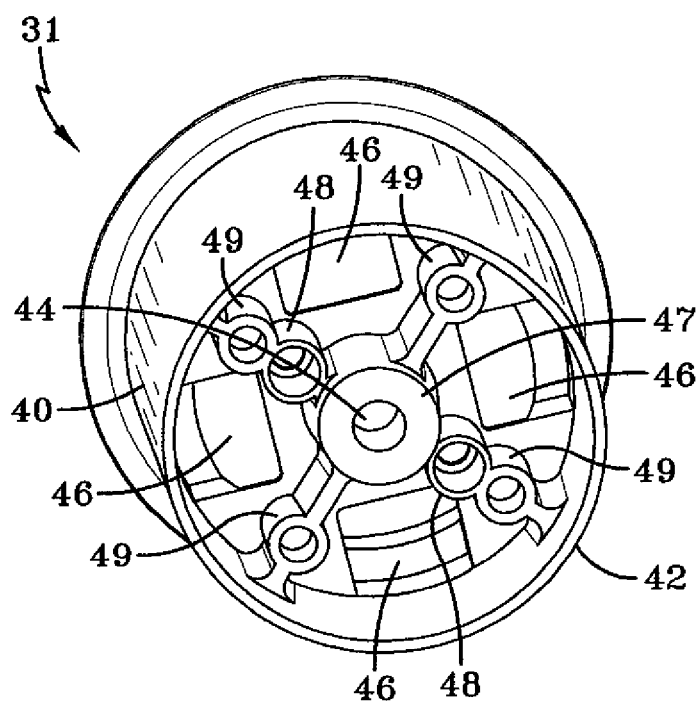
FIG. 5 is a bottom perspective view of the cup holder component of the cup holding assembly.

The construction of cup holder 31 is probably best shown in FIGS. 4 and 5 and includes a generally cylindrical sidewall 40 being open at its top, where a flange 41 is formed, and open at its bottom 42. A shelf 43 is formed near the open bottom 42 and includes a central aperture 44 and opposed sockets 45 radially spaced from central aperture 44. Four slots 46 are formed at the periphery of shelf 43 and are spaced ninety degrees of each other. Slots 46 also extend slightly up sidewall 40. A boss 47 is formed under central aperture 44 of shelf 43, and bosses 48 are also formed under sockets 45. In addition, socket bosses 49 are formed on the bottom of shelf 43 and are positioned radially outward of bosses 48.

Figure 6:
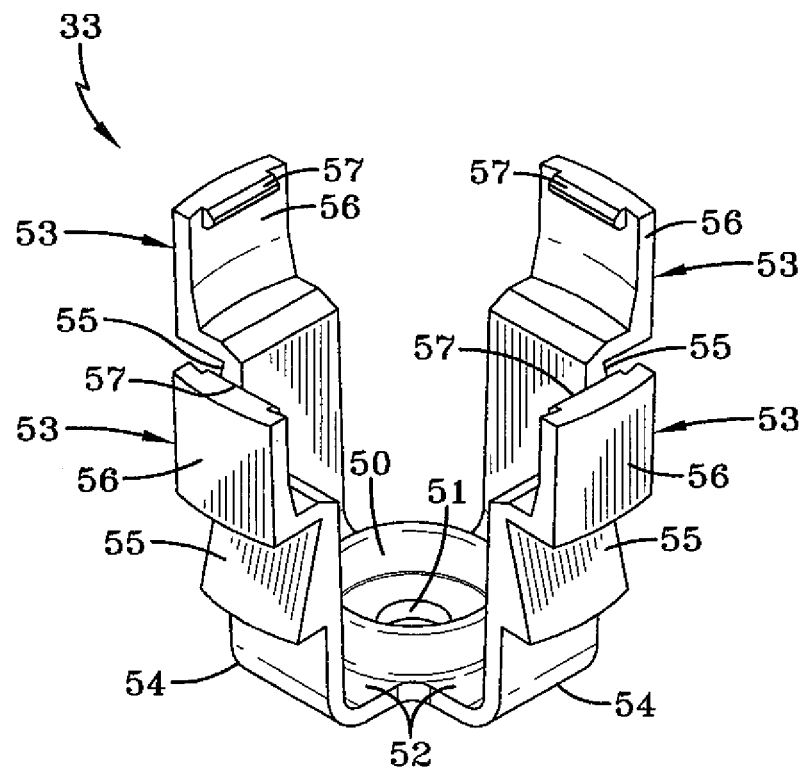
FIG. 6 is a perspective view of the cup gripping component of the cup holding assembly.
Figure 7:
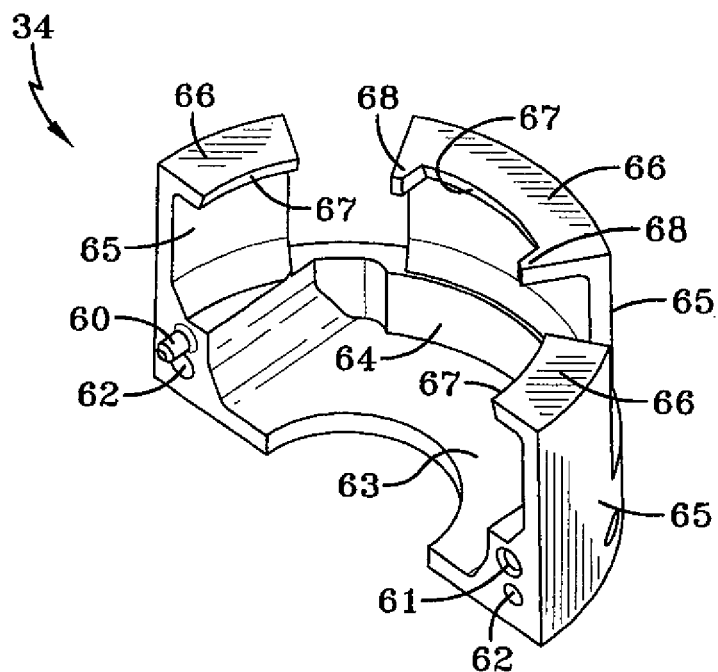
FIG. 7 is a perspective view of one half of the actuator component of the cup holding assembly.

As best seen in FIG. 6, cup gripping assembly 33 includes a central hub 50 having an aperture 51 therethrough. A base 52 extends outwardly from hub 50 and carries four arms, generally indicated by the numeral 53, which extend upwardly from base 52 evenly spaced at ninety degrees around hub 50. A living hinge 54 is formed at the junction of each arm 53 and base 52 so that arms 53 are pivotable relative to base 52. Each arm 53 includes an outer conical surface 55 which, as will be hereinafter described, is engaged by actuator assembly 34 to pivot arms 53 inwardly. A finger 56 having an inwardly directed lock tab 57 is formed at the top end of each arm 53.

Actuator assembly 34 is shown as being formed from two identical halves, for ease of molding the plastic materials, but could be formed as one piece. When formed from two halves, a pin 60 and socket 61 formed in each half assure proper alignment of the halves which can then be attached to each other by screws (not shown) received through apertures 62. When so assembled, actuator assembly 34 includes a generally circular base 63 having an abbreviated sidewall 64 extending upwardly therefrom. Circumferentially spaced actuator arms 65 extend upwardly from sidewall 64 and are spaced approximately ninety degrees of each other. Each arm 65 has an inwardly directed lip 66 formed near the top thereof, and each lip 66 has an inner actuating surface 67.

Figure 8:
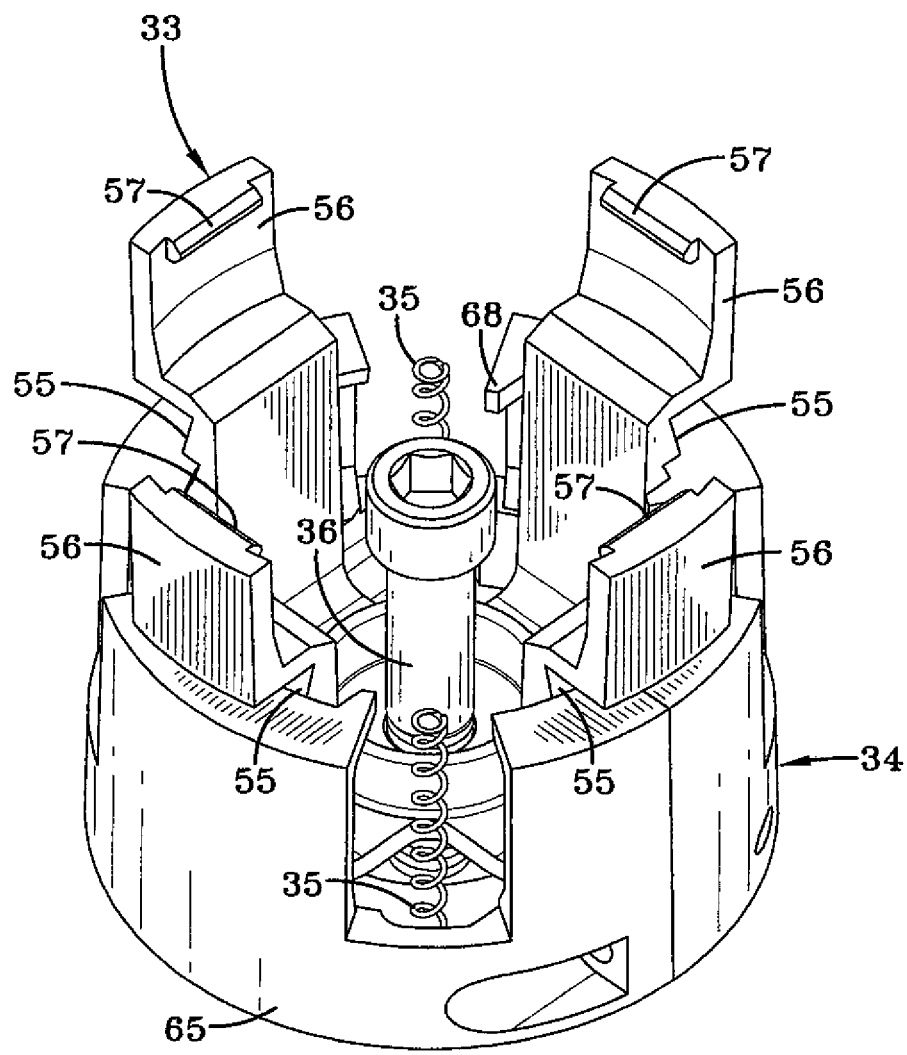
FIG. 8 is a perspective view of the assembled cup gripping and actuator components.
Figure 9:
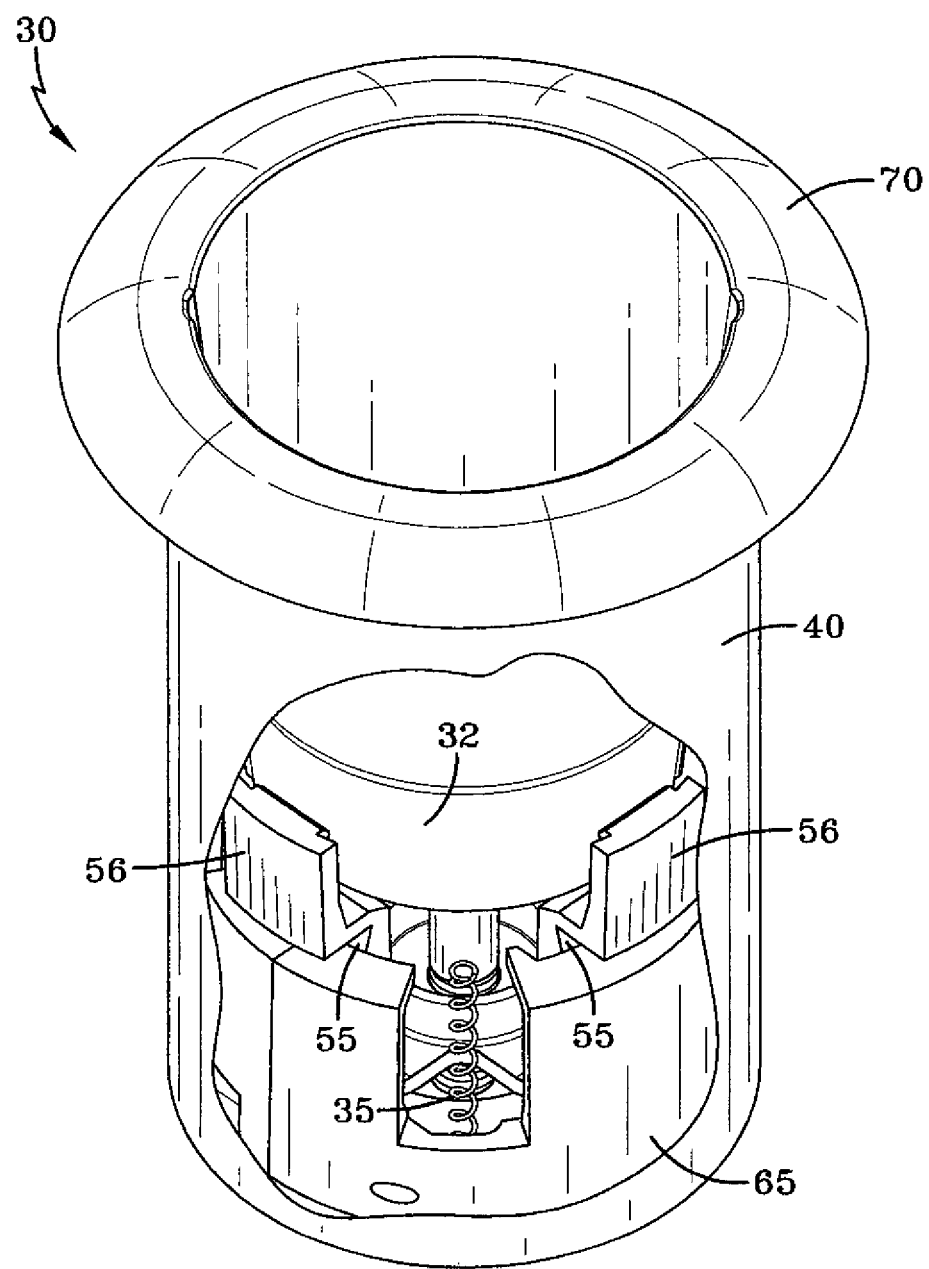
FIG. 9 is a perspective view of the cup holding assembly showing the cup broken away.

Cup gripping assembly 33 and actuator assembly 34 are assembled together and positioned in the bottom of cup holder 31 as now to be described. As shown in FIG. 8, gripping assembly 33 is positioned within actuator assembly 34 with its arms 53 aligned with arms 65 of actuator assembly 34. For ease of such alignment, one or more of the arms 65 may be provided with tabs 68 extending inwardly from the edges of surface 67 such that an arm 53 of gripping assembly 33 will be received between tabs 68. When so positioned, actuating surfaces 67 are adjacent to and otherwise bear against conical surfaces 55 of gripping assembly 33.

Figure 12:
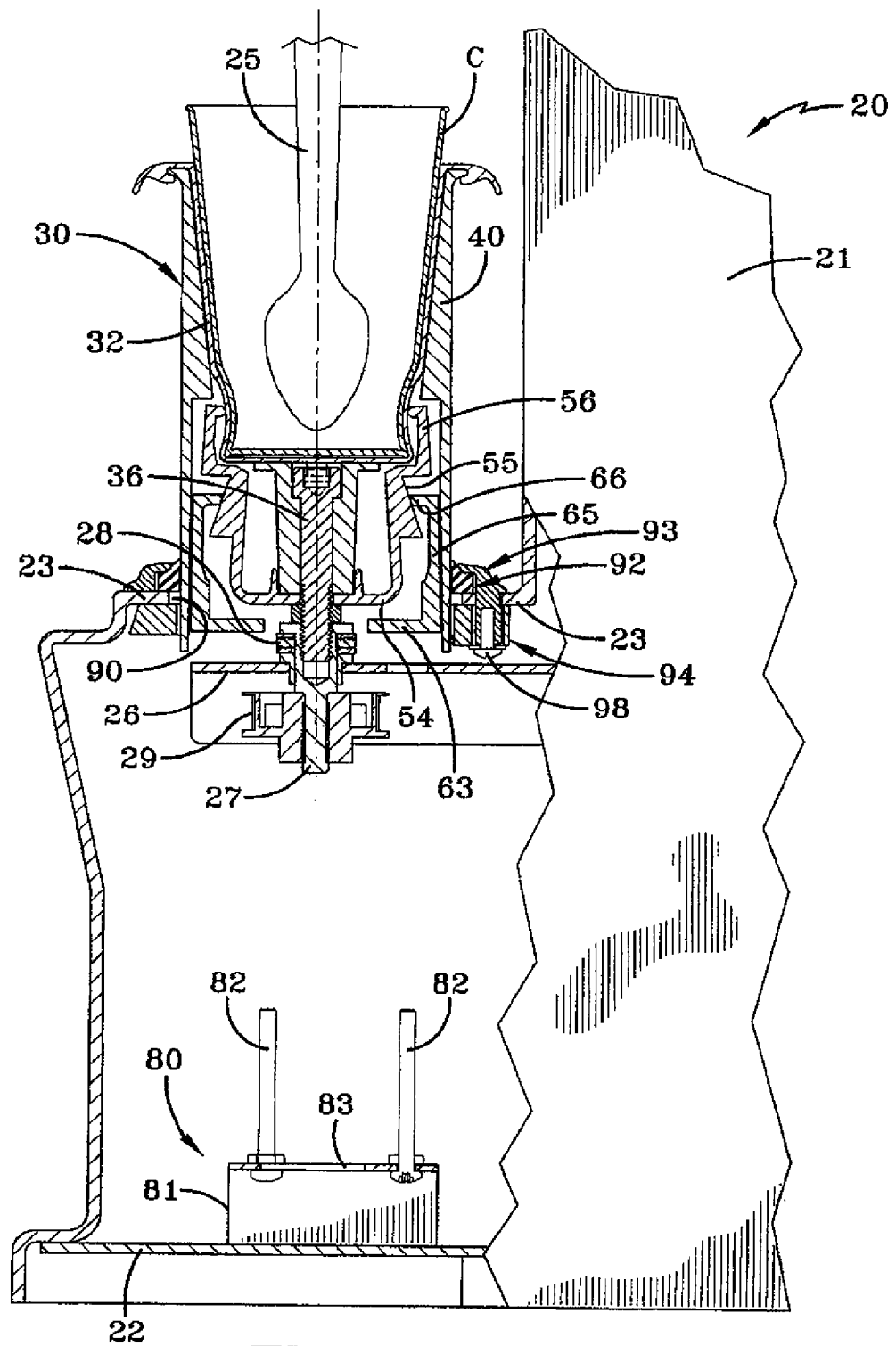
FIG. 12 is a sectional view taken substantially along line 12-12 of FIG. 1 and showing the cup holding assembly gripping the cup.
Figure 13:
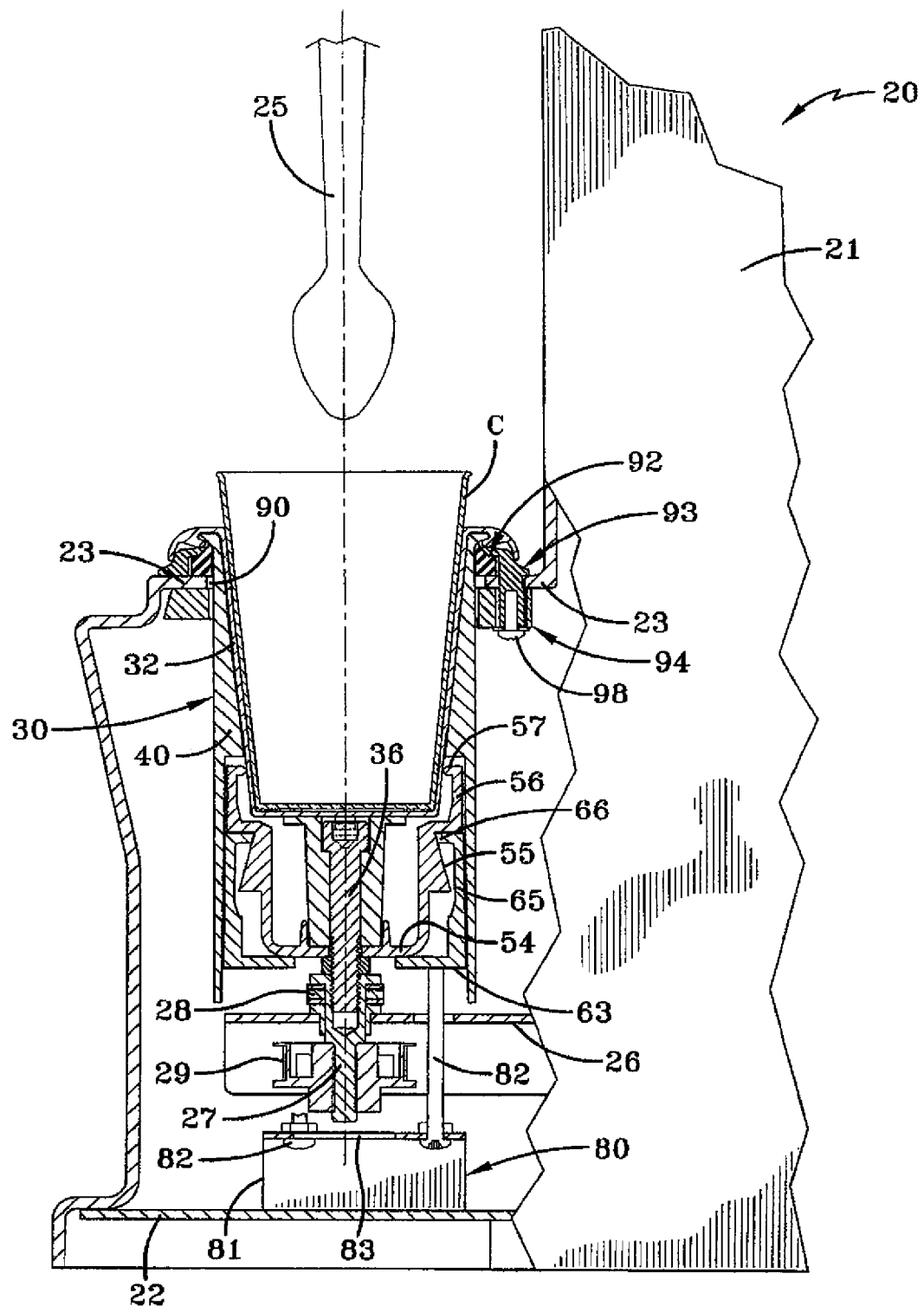
FIG. 13 is a sectional view like FIG. 12 but showing the cup released from the cup holding assembly.

Springs 35 are inserted into socket bosses 49 of cup holder 31, and the assembled gripping assembly 33 and actuator assembly 34 are inserted into the bottom of cup holder 31. As such, springs 35 bear against base 63 of actuator assembly 34. Also, at this time, the fingers 56 of the arms 53 of gripping assembly 33 are exposed through cup holder slots 46 thereby allowing fingers 56 to communicate with the inside of cup holder 31. Bolt 36 is inserted through central aperture 44 of cup holder 31 and through aperture 51 of gripping assembly 33, and thus gripping assembly 33 is attached to cup holder 31. However, actuator assembly 34 is free to float within cup holder 31. As shown in FIGS. 12 and 13, bolt 36 is also utilized to connect cup holding assembly 30 to travel plate 26.

In order to mix food, a cup C or other container is placed in cup holding assembly 30. While it may be placed directly into cup holder 31, preferably it is positioned into boot 32 which is, in turn, carried by cup holder 31. To that end, boot 32 is shaped like the inside of cup holder 31 and includes lugs 69 formed on the bottom thereof. Lugs 69 snap into sockets 45 of cup holder 31 to hold boot 32 in place. Also, boot 32 is provided with an upper peripheral lip 70 that engages the top flange 41 of cup holder 31, as best seen in FIGS. 10-13. Fingers 56, or more specifically lock tabs 57, bear against the boot 32 to engage the cup C within the boot. The presence of boot 32 protects the cup from any possible damage which could be caused by fingers 56, and the presence of flexible boot 32 also accommodates cups of slightly varying sizes.

When travel plate 26 is in the up position as shown in FIG. 1 and more particularly in FIG. 12, food is being mixed in cup C by agitator 25. At the same time, cup holding assembly 30 is being rotated on shaft 27. But cup C is prevented from rotating with the cup holding assembly because in this position the bias of springs 35 is maintaining arms 65, and in particular actuating surfaces 67 thereof, down or conical surfaces 55 of gripping assembly 33 which, in turn, pushes arms 53 of gripping assembly 33 inwardly, pivoting them on hinges 54. This condition is shown in FIG. 12. However, when travel plate 26 moves downwardly to the FIG. 13 position, indicative of the mixing process being completed, the grip on cup C is released by a release initiating assembly generally indicated by the numeral 80 and now to be described.

As best shown in FIG. 1, release initiating assembly 80 includes a bracket 81 which is attached to lower platform 22. Bracket 81 carries a plurality of upstanding posts 82 which are shown to be in the form of screws threaded onto the upper surface 83 of bracket 81. As travel plate 26 approaches the FIG. 13 position, posts 82 will contact the bottom of base 63 of actuator assembly 34. Such overcomes the bias of springs 35 and allows actuator assembly 34 to move relative to gripping assembly 33. As such, actuating surface 67 of actuator assembly 34 moves up conical surface 55 of gripping assembly 34 which allows arms 53 to pivot away from cup C and release the grip so that cup C can be removed from the cup holding assembly 30.

Figure 14:
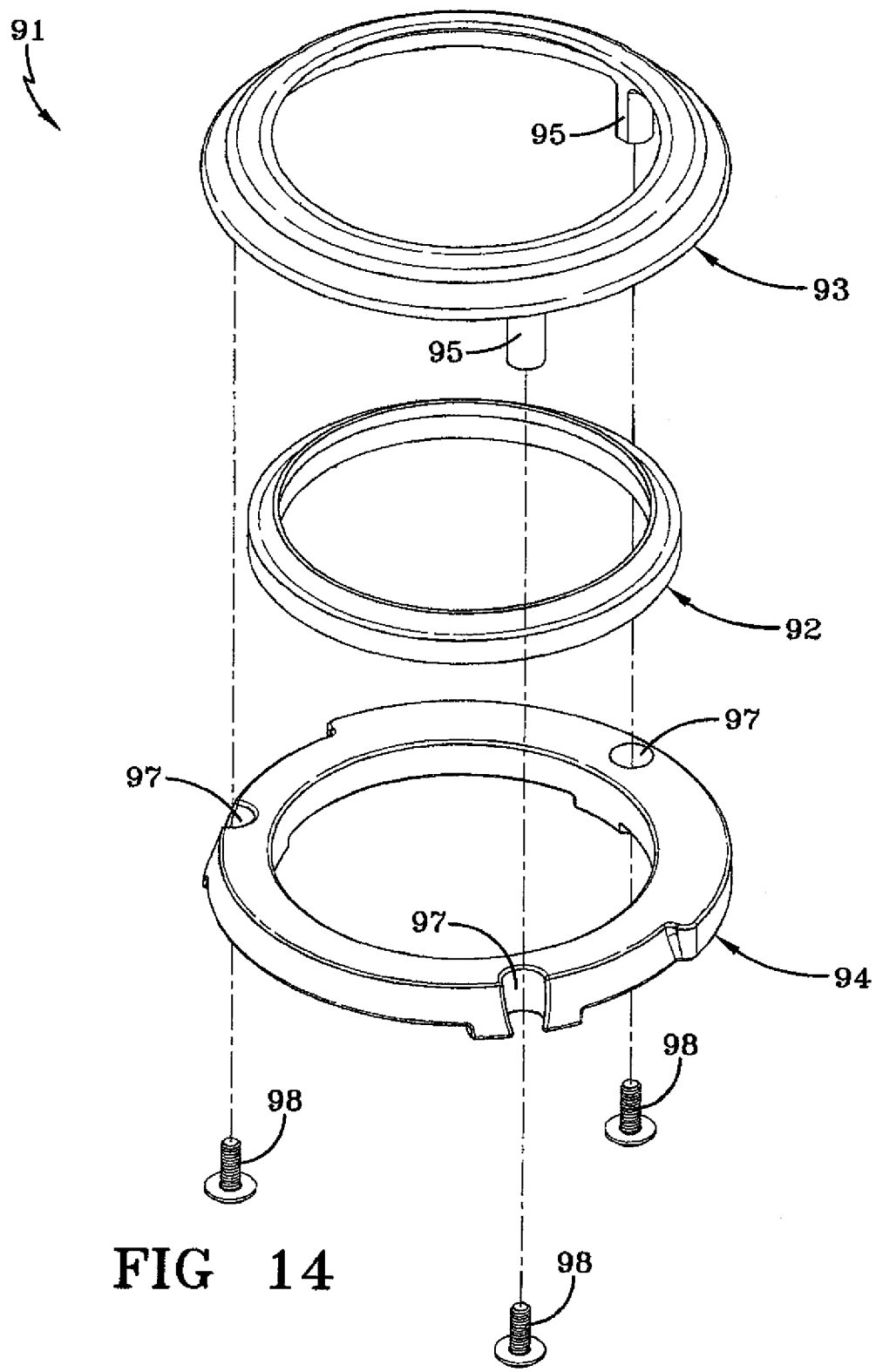
FIG. 14 is an exploded top perspective view showing the components of the seal for the cup holding assembly.
Figure 15:
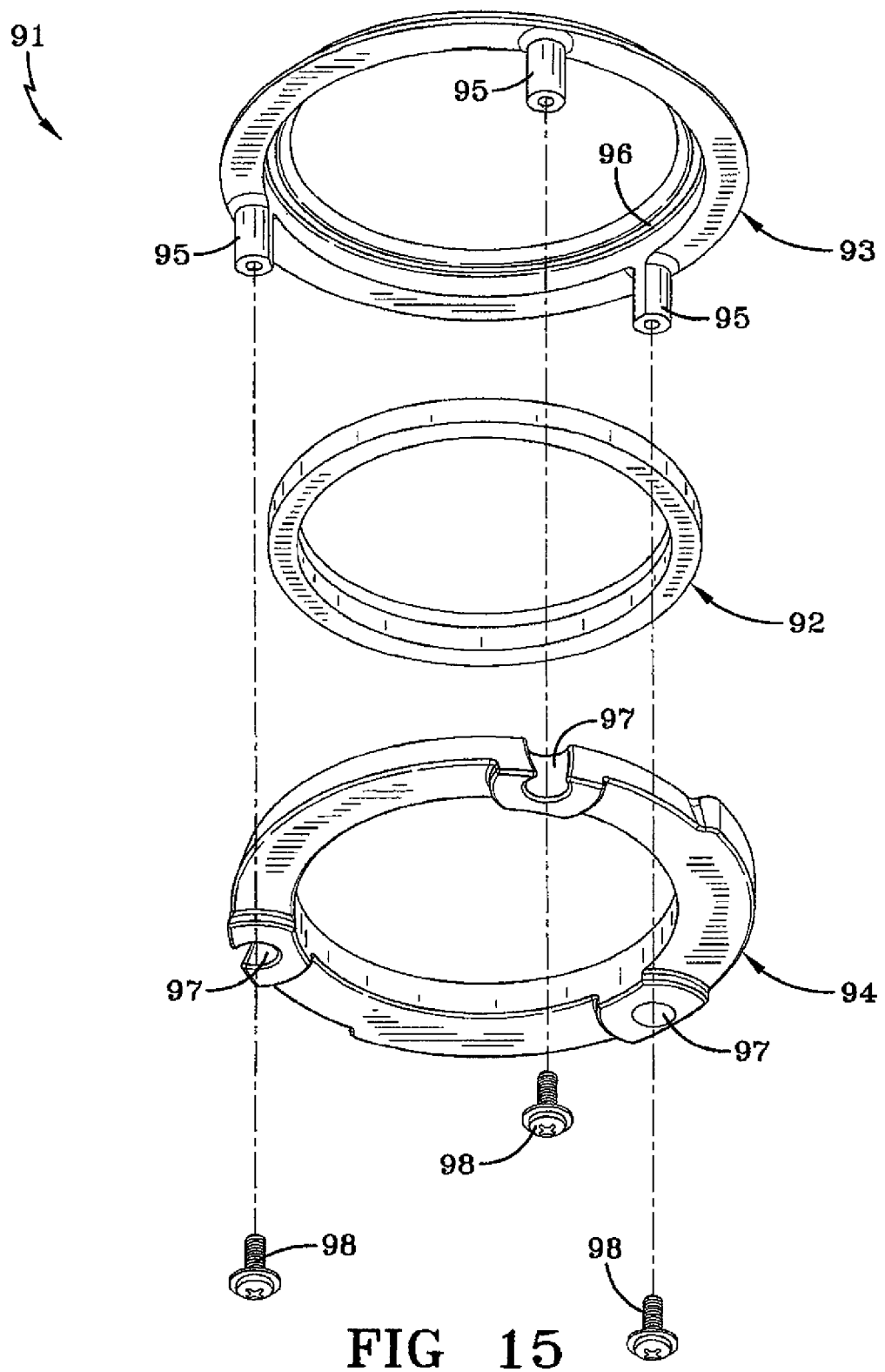
FIG. 15 is an exploded bottom perspective view showing the components of the seal for the cup holding assembly.
Figure 16:
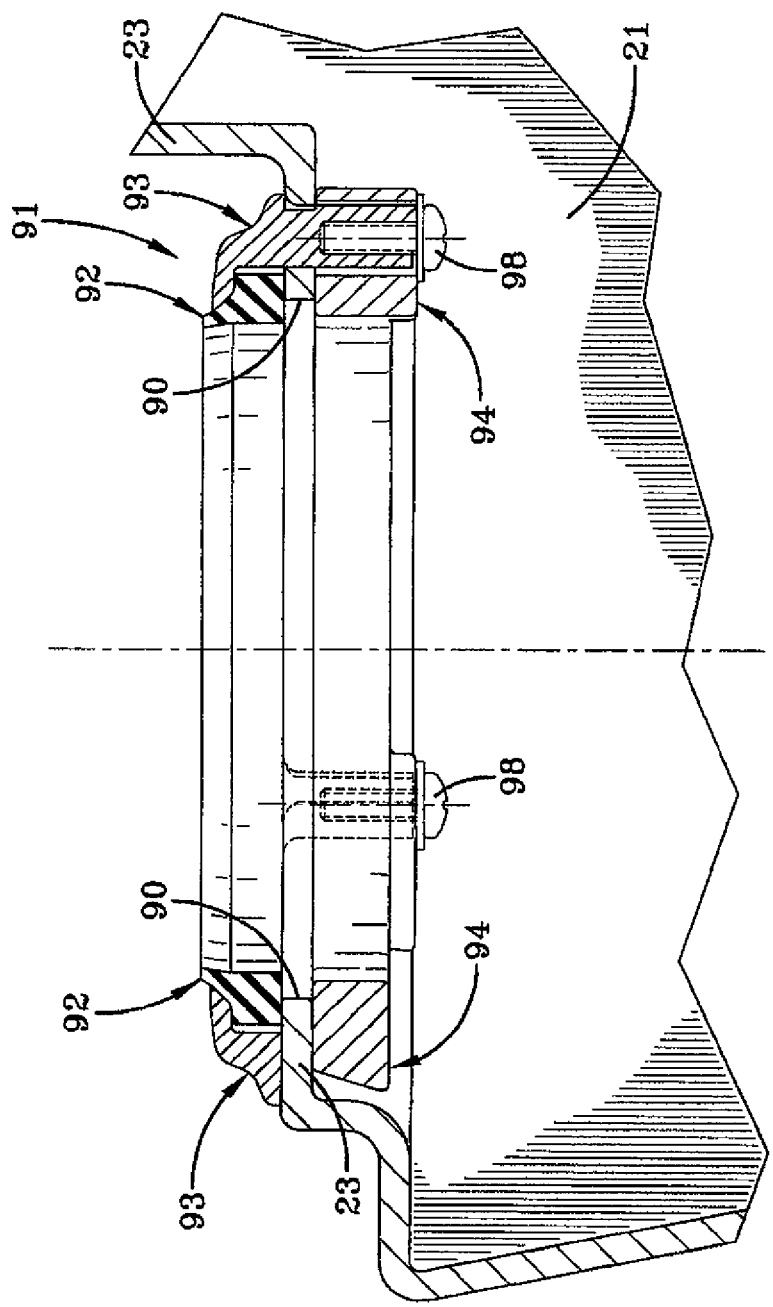
FIG. 16 is a sectional view taken substantially along line 16-16 of FIG. 1.

When the cup holding assembly 30 is moving upwardly and downwardly, it is passing through an opening 90 (FIGS. 12 and 13) formed in intermediate platform 23 or an equivalent area of housing 21. Opening 90 thus provides access to the machine components that are located below it which is basically those components that may be on lower platform 22. Since food drippings could often accumulate on and otherwise run down the outside of cup holder 31 and potentially pass through opening 90, a seal assembly, generally indicated by the numeral 91 and best shown in FIGS. 14-16, is provided.

Seal assembly 91 includes an elastomeric gasket 92 which is carried between an upper plastic plate generally indicated by the numeral 93, and a lower plastic plate generally indicated by the numeral 94. Upper plate 93 is shown as being in the form of a ring having three bosses 95 extending downwardly therefrom. The internal lower periphery 96 of the ring of plate 93 receives gasket 92 which may be press fit therein. The lower plate 94 is also ring shaped and is provided with three recesses 97 which receive bosses 95 therein. Fasteners 98 are provided to hold seal assembly together with the edges of platform 23 at aperture 90 sandwiched therebetween as shown in FIG. 16. As shown there, gasket 92 extends into the aperture 90 so that it bears against cup holder 31 as it passes therethrough. The edges of the housing platform are held between the upper plate 93 and the lower plate 94 by virtue of the attachment by fasteners 98.

In light of the foregoing, it should thus be evident that a food mixing machine constructed as described herein substantially improves the art and otherwise accomplishes the objects of the present invention.

What is claimed is:

1. A machine using a rotating agitator to mix food in a cup comprising a housing, an opening in said housing, a cup holder adapted to receive the cup and to be moved through said opening, and a seal assembly carried by said housing around said opening, said seal assembly including a seal to engage said cup holder as said cup holder moves through said opening.

2. The machine of claim 1 wherein edges define said opening, said seal assembly engaging said edges.

3. The machine of claim 2 wherein said seal is a gasket and said seal assembly includes a first plate carrying said gasket, a second plate, and means to attach said first plate to said second plate with said gasket and said edges between said first and second plates.

4. The machine of claim 1 further comprising a gripping member positioned with said cup holder, and an actuator moveable relative to said gripping member so that said gripping member can selectively engage a cup positioned in said cup holder.

* * * * *